US006381626B1

(12) United States Patent
De Leo et al.

(10) Patent No.: US 6,381,626 B1
(45) Date of Patent: Apr. 30, 2002

(54) ATM VIDEO ADVERTISING

(75) Inventors: Stephen Lebro De Leo, Milburn; Michael J. Rosenzweig, Flanders; Hope L. Kirschner, Boonton, all of NJ (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/296,353

(22) Filed: Apr. 22, 1999

(51) Int. Cl.[7] .............................................. G06F 13/00
(52) U.S. Cl. .......................... 709/200; 705/43; 705/14; 235/379
(58) Field of Search ............... 705/43, 44, 1, 705/14; 235/379; 709/200

(56) References Cited

U.S. PATENT DOCUMENTS

| 5,305,195 | A | | 4/1994 | Murphy ........................ 705/1 |
| 5,504,675 | A | * | 4/1996 | Cragun et al. ................ 705/14 |
| 5,604,542 | A | * | 2/1997 | Dedrick ...................... 348/552 |
| 5,643,088 | A | * | 7/1997 | Vaughn et al. ................ 463/40 |
| 5,793,281 | A | * | 8/1998 | Long ........................ 340/384.1 |
| 5,870,724 | A | * | 2/1999 | Lawlor et al. ................ 705/42 |
| 5,955,710 | A | * | 9/1999 | DiFranza .................... 187/396 |
| 5,966,696 | A | * | 10/1999 | Giraud ........................ 705/14 |
| 6,078,896 | A | * | 6/2000 | Kaehler et al. ................ 705/14 |
| 6,129,274 | A | * | 10/2000 | Suzuki ........................ 235/361 |
| 6,169,542 | B1 | * | 1/2001 | Hooks et al. ................ 345/327 |
| 6,205,432 | B1 | * | 3/2001 | Gabbard et al. .............. 705/14 |
| 6,223,983 | B1 | * | 5/2001 | Kjonaas et al. ............. 235/379 |

OTHER PUBLICATIONS

J.B. Arndorfer; "ATMs are latest place–based ad medium, Bank money machines will run full–motion spots"; Tribune Newspapers; Nov. 1997.*
"A New Meaning For ATM's: Advertising Their Movies, Company Plans to Show Clips, Sell Tickets," W. Gruber, *Chicago Tribune*, Mar. 10, 1998.
"EDS Is Testing Commercials on Teller Machines," C. Keenan, *American Banker*, Dec. 12, 1997.
"Talking Ads May be Coming Soon to a Gas Pump or Automated Teller Machine Near You," C.M. Cropper, *The New York Times*, Dec. 12, 1997.

* cited by examiner

*Primary Examiner*—Kenneth R. Coulter
(74) *Attorney, Agent, or Firm*—L. Joy Griebenow; Baker Botts LLP

(57) ABSTRACT

Message files preferably comprising MPEG video messages are provided to transaction terminals for display of non-transaction messages to users during a terminal transaction. The messages are selected and displayed upon transaction approval. Operation of the terminal in accordance with transaction approval, i.e., to dispense cash or print a record, is initiated during the interval when the selected message is displayed.

20 Claims, 4 Drawing Sheets

ATM VIDEO ADVERTISING

FIELD OF THE INVENTION

This invention relates to systems for providing messages to automated terminal users for display during the processing of transactions.

BACKGROUND OF THE INVENTION

U.S. Pat. No. 5,305,195 to Murphy describes a computer system wherein a terminal is provided for access to a college multi-frame computer for use by students in connection with course registration, payment of fees, and similar tasks. The terminals are additionally connected by dedicated coaxial lines to a "commercial computer" which downloads a video commercial message for storage in the terminals. The terminals are provided with an interrupt control 88, which responds to a "hold" condition, resulting from the terminal awaiting a response from the college computer, to initiate display of the stored video message. While the message is being displayed, the interrupt control 88 prevents the terminal processor from sending data to the terminal video monitor until the stored video message is completed.

SUMMARY OF THE INVENTION

The present invention is used in a system having an interactive transaction terminal with a video monitor, wherein the terminal responds to operation by an authorized user to provide information, goods or services, and displays a sequence of transaction messages on the monitor. According to the invention, message files comprising digital data corresponding to at least one non-transaction message are provided to the terminal. The transaction terminal operates in response to activation by an authorized user to provide the sequence of transaction messages on the monitor. The transaction terminal reads a selected message file and displays a non-transaction message to the user interposed with the sequence of transaction messages.

In one embodiment of the present invention, display of the non-transaction message is initiated by authorization of the user's requested transaction prior to notification of that authorization to the user.

The invention provides a method for supplying non-transaction messages to a user, wherein message files corresponding to a plurality of selectable non-transaction messages are stored at a terminal and the terminal is operated in response to transaction data entered by an authorized user to provide a sequence of transaction messages on a video monitor. One of the non-transaction messages is selected for display to the user and the selected non-transaction message is displayed within the sequence of transaction messages.

In accordance with the invention, there is provided an improvement to a system wherein a transaction terminal communicates with at least one server for processing transactions requested by a terminal user, and wherein a non-transaction message is displayed to the user during a transaction. According to the improvement, the transaction terminal is provided with a plurality of selectable message files, each comprising digital data corresponding to a non-transaction message, and wherein a command message is provided by the at least one server to the transaction terminal for controlling the timing of the display of a non-transaction message to the user.

According to another aspect of the invention, transaction messages are arranged in a screen load sequence which sequence includes a first time interval having no screen-displayed transaction messages. Digital data corresponding to at least one non-transaction video display message having a display time interval substantially equal to the first time interval is provided to a transaction terminal and the video display message is read and displayed to the user during the first time interval of the screen load sequence.

In accordance with the invention, a message file corresponding to at least one non-transaction message is provided at a transaction terminal. Transaction data is received from a user and processed to generate an authorization message, approving cash or media dispensing by the terminal to the user. Preferably, the non-transaction message is displayed to the user in response to the authorization message and operation of the terminal to dispense the cash or media is initiated during display of the non-transaction message.

In accordance with the invention, a message file corresponding to at least one non-transaction message is stored at a transaction terminal. Transaction data is received from a user and processed to generate an authorization message, approving printing of a transaction record by a printer at the transaction terminal for the user. Preferably, the non-transaction message is displayed to the user in response to the authorization message and operation of the terminal to print a transaction record is initiated during display of the non-transaction message. The at least one non-transaction message can have printed promotional material associated therewith which is printed by the terminal.

The invention provides an improvement wherein a terminal is arranged to store messages files corresponding to a plurality of non transaction messages, and wherein the terminal is provided with a configuration file arranged to control the selection of non-transaction messages for presentation to the user.

In accordance with the invention, there is provided an improvement to a transaction terminal arranged to process transactions by an authorized user and to present non-transaction messages. According to the improvement, the terminal is arranged to store a plurality of message files corresponding to non-transaction messages and respond to a configuration file for selecting non-transaction messages to be displayed to a user. The configuration file is arranged to control selection of non-transaction messages over a specified time period. During the specified time period a subsequent configuration file for a subsequent time period is provided to the transaction terminal.

For a better understanding of the invention, together with other and further objects, reference is made to the following description, taken in connection with the accompanying drawings, and its scope will be pointed out in the appended claims.

DESCRIPTION OF PREFERRED EMBODIMENTS

A preferred embodiment of a system for practicing with the present invention is shown with respect to an application of the invention to an automatic banking transaction system having at least one host computer and a plurality of transaction terminals, such as automated teller machines (ATMs) for use by authorized users. Such systems are well known and widely used by banks to enable their customers to obtain cash, make deposits, transfer funds, make payments, perform balance inquires, etc. without waiting in line for a teller and during extended hours when banks are closed.

While the system is described with respect to banking terminals, such as ATMs, those familiar with the art will recognize that the present invention can be applied to a broad range of transaction terminals that use a video monitor for communicating with a terminal user, including, for example and not by way of limitation, terminals for vending airline or rail tickets, theater tickets, prepaid telephone cards, gasoline, etc.

In particular, according to the present invention, terminals are arranged to have a data storage facility, such as a disk drive or CD ROM, which stores audio, video or graphic messages to be displayed to a terminal user during a transaction.

Figure 1:
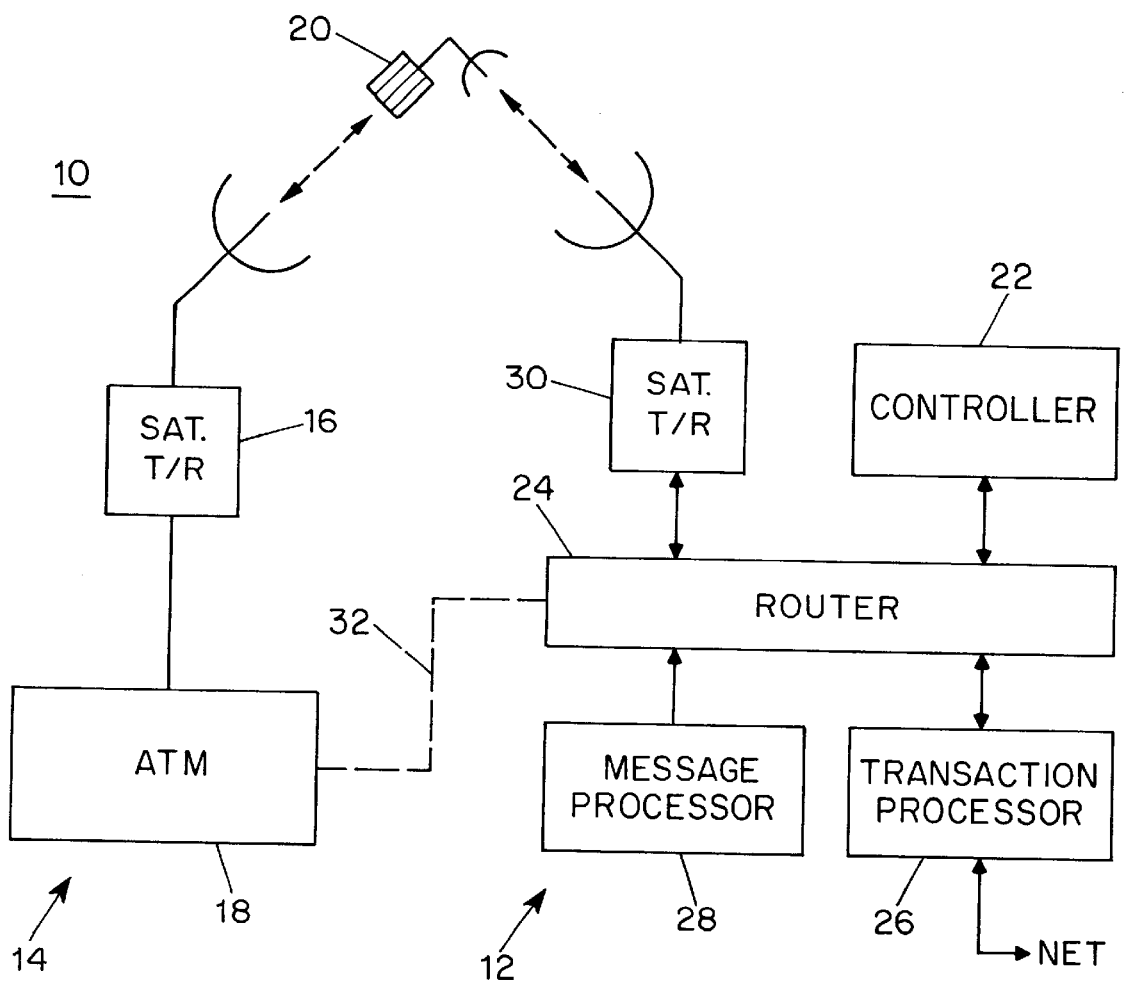
FIG. 1 is a block diagram of a system in accordance with a preferred embodiment of the present invention.

Referring to FIG. 1, there is shown a system 10 according to a preferred arrangement, which includes a host 12 and a transaction station 14. Transaction station 14 includes an ATM 18, and preferably a communications station 16 for receiving and optionally transmitting data to host 12. Preferably, communication station 16 takes the form of a satellite communication link, but other high bandwidth communications systems can be implemented in the alternative.

In the example shown in FIG. 1, host 12 includes a controller 22, which performs host control functions and oversees host communications. Router 24 manages communications between transaction processor 26, message processor 28 and transaction station 14 associated with the host 12. Such communications include routine transaction messages, for purposes of handling banking transactions, that are processed by transaction processor 26. In addition, message processor 28 communicates messages, such as video segments and message delivery instructions, called configuration files, to terminals 18, for providing non-transaction messages to a user of a terminal, as will be described. Preferably, the video segments are stored and transmitted in a standard compressed video format, such as MPEG (Motion Picture Expert Group).

System 10, illustrating a preferred arrangement of the invention, includes three distinct communications message content types, which will be defined for further understanding.

Message files, as used herein, refer to data files representing video, graphic, and/or audio information, which may be in a format, such as MPEG, which enables substantially real time read-out of message file data from a data storage device, and video, graphic, and/or audio reproduction of the message to a user at a terminal.

Configuration files are data files used to control the selection and presentation of message files at a terminal. Typically configuration files designate the message files to be presented to a terminal user during designated periods of time, preferably by hour and da Configuration files may also be arranged to select particular messages upon command b) either the terminal processor or the host 12, wherein messages are selected according to transaction data or other criteria, as will be discussed.

Transaction data, as used herein, refers to digital data relating to the primary transaction requested by the user. Typical transaction data would include data read from the banking card, debit card or credit card of a terminal user; data entered by a user, such as e PIN number, transaction type, transaction amount, etc. and data sent by the host 12 relating to the transaction, such as requests for further information regarding selection of an account, regarding a usage fee, transaction approvals or transaction denial messages and responses to such requests.

Typically, systems that include a host 12 and a plurality of transaction stations 14 provide data communications between the host 12 and the terminals 14 utilizing land line, such as dedicated or dial-up telephone lines. Because of bandwidth limitations, conventional telephone lines are not well suited for sending large message files from the message processor 28 of host 12 to transaction stations 14. Transmission bandwidth on telephone links is so limited that sending a message file corresponding to a short, e.g. 15 second, video segment, even in compressed MPEG format, would require lengthy or excessive transmission time, which would impair the communications required to process transactions, the primary function of system 10. Accordingly, it is preferred to provide other means for providing message files to transaction stations 14. One such technique is physically transporting a storage device such as tapes discs or CD ROM devices, having the required messages to transaction stations 14 and having the storage devices installed by those normally servicing the terminal, when they go to the transaction station 14 to load cash dispensers, to load receipt printer tape, or perform other servicing functions. It is preferable, however, to provide an electronic data delivery technique, whereby message files and configuration files can be frequently updated and changed.

The system 10 of FIG. 1 utilizes a satellite communications network having terminal satellite station 16, host satellite station 30 and satellite 20 to deliver message files, and also configuration files to terminals 18 of transaction stations 14. In particular a broadcast or multicast technique is used to simultaneously send message files and configuration files to multiple transaction stations 14. Alternately message files can be broadcast over the satellite network while configuration files are sent by land lines. Transaction messages can be sent and received by Host 12 using either the satellite communications network or conventional land lines It should be understood that the system of the invention is not confined to physical delivery or satellite broadcast of message files. Other data delivery techniques having sufficient bandwidth for his task include, for example, ISDN high bandwidth telephone link, fiber optic link, coaxial cable, broadband microwave links and the like.

Figure 2:
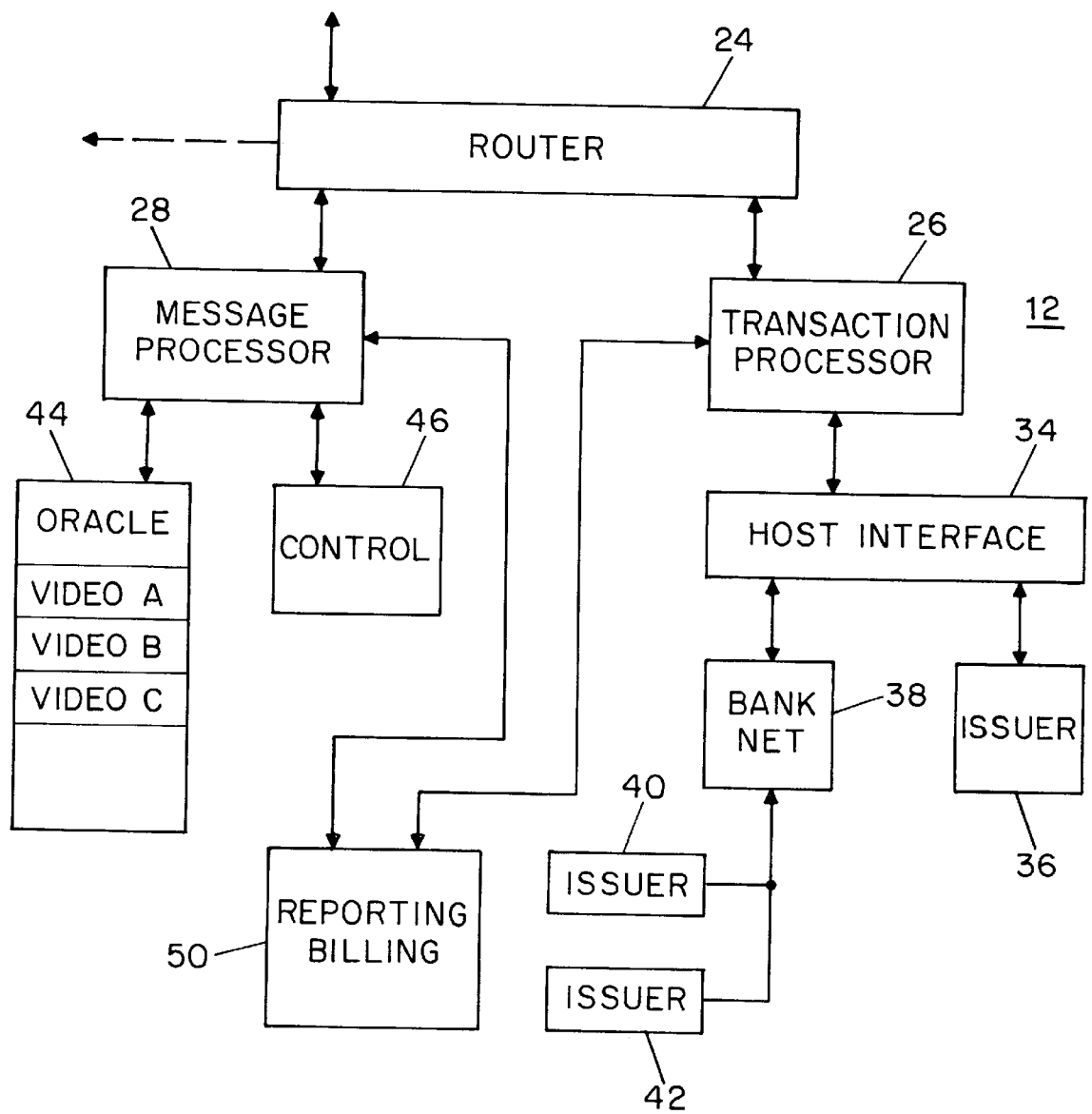
FIG. 2 is a block diagram of an exemplary host computer system usable in the FIG. 1 system.

Host 12 is shown in greater detail in FIG. 2. In one embodiment, the message processor 28 is a Unix-based system which stores video message files in an Oracle based database 44, however, the practice of the invention is not limited to this exemplary operating system and database software. The system is operated using a control computer 46, which operates message processor 28 to generate broadcast messages by which message files are sent to terminals 18 at transaction station 14. It should be understood that different message files can be distributed to various terminals 18 in system 10, so that the terminals 18 can display non-transaction messages that can be coordinated to various campaigns. Accordingly, for each broadcast of a message file, message processor 28 is controlled by control computer 46 to prepare a broadcast header which specifies the terminal or terminals which are to receive and store the message file.

Accordingly, based upon the message header, a message file may be sent to one terminal, to a number of designated terminals, to all terminals or to all terminals in a class, e.g. terminals of a particular type, those with a particular network affiliation, those associated with a particular bank or a particular retail chain or to terminals in a particular geographic area.

Once message processor 28 formulates the message file with its associated message header, it is passed onto the router 24 for possible assembly with other message files and thereafter transferred to the satellite transmission station 30 for broadcast. Alternately, the message file may be recorded on a storage media, such as a disc memory or CD ROM and transported to terminals 18 by service personnel. Alternately, router 24 may send the message file to terminal 18 over a suitable communication backbone such as an ISDN, fiber optical transmission line, cable network, broadband microwave link or other suitable communication path.

In addition to message files, message processor 28, in connection with control computer 46, is used for the formulation of configuration files. Configuration files are data files used by terminals 18 to control which message file, previously sent to terminal 18, is to be displayed to a terminal user. Configuration files, for example, may cause message files to be selected and displayed at different times of the day. For example, a message file promoting a fast-food restaurant may be displayed during the period 11 AM to 2 PM to promote lunch trade, while a message file promoting a motion picture may be selected in the period 4 PM to 8 PM. Other messages, for example, promoting an automobile might be available for selection in rotation at any time of day or as "default" selection, during times when other messages have not been designated for display. The configuration file can also include data relating to printed promotional materials, such as coupons, associated with selected message files.

The configuration file may also control the rotation of message file selection, at the terminal. For example, a configuration file may cause a terminal to select in rotation among a plurality of message files. The configuration may cause some message files to be selected more frequently than others.

The configuration file may also be arranged to cause the terminal 18 to select message files according to transaction data. For example, a message may offer a user having an account at another bank an incentive to transfer his account to the bank controlling a particular terminal, such as free checking for one year. This message would not be selected for presentation to the bank's own customers who are charged for checking. This selection may be made using data read from the banking card presented at the terminal. Further, users who present a card issued in another country might cause selection of a message promoting tourist services. Further, users who request a transaction in an alternate language might cause selection of a message file having a corresponding language text or audio. Further, different message files might be selected according to the transaction amount. These features may be implemented by the host 12 on terminal 18.

The configuration file can also respond to message file selection signals originated by host 12 or the issuer, wherein selection can be made on the basis of data known to the host or issuer such as account balance. Accordingly, the host or issuer can identify the terminal user as high net worth individual and provide a demographically targeted non-transaction message promoting luxury automobiles or investment services. Alternately, a customer who has recently paid off a car loan may be targeted with messages promoting new cars, auto loans or auto-leasing. A user whose transaction has been denied by the issuer may receive a message designated by the host promoting its services for banking or credit.

In one arrangement, configuration files are formulated and sent to transaction terminals 18 on a periodic basis, according to the requirements of the message sponsors. Each configuration file may provide operating instructions to be used for a 12-or-24 hour period or until replaced by a succeeding configuration file. Typically, a first configuration file may be effective for a period starting at midnight. While the first configuration file is being used, a second subsequent configuration file effective starting at noon is sent to the terminal 18. Preferably, the host 12 sends the second configuration file at a time sufficiently in advance of the noon effective time so that its receipt by terminal 18 can be confirmed. In the absence of confirmation, the configuration file can be resent by host 12. In the event a terminal 18 fails to receive a new configuration file by the noon expiration of the first configuration file, a default procedure can be implemented for continued use of the first configuration file.

Figure 3:
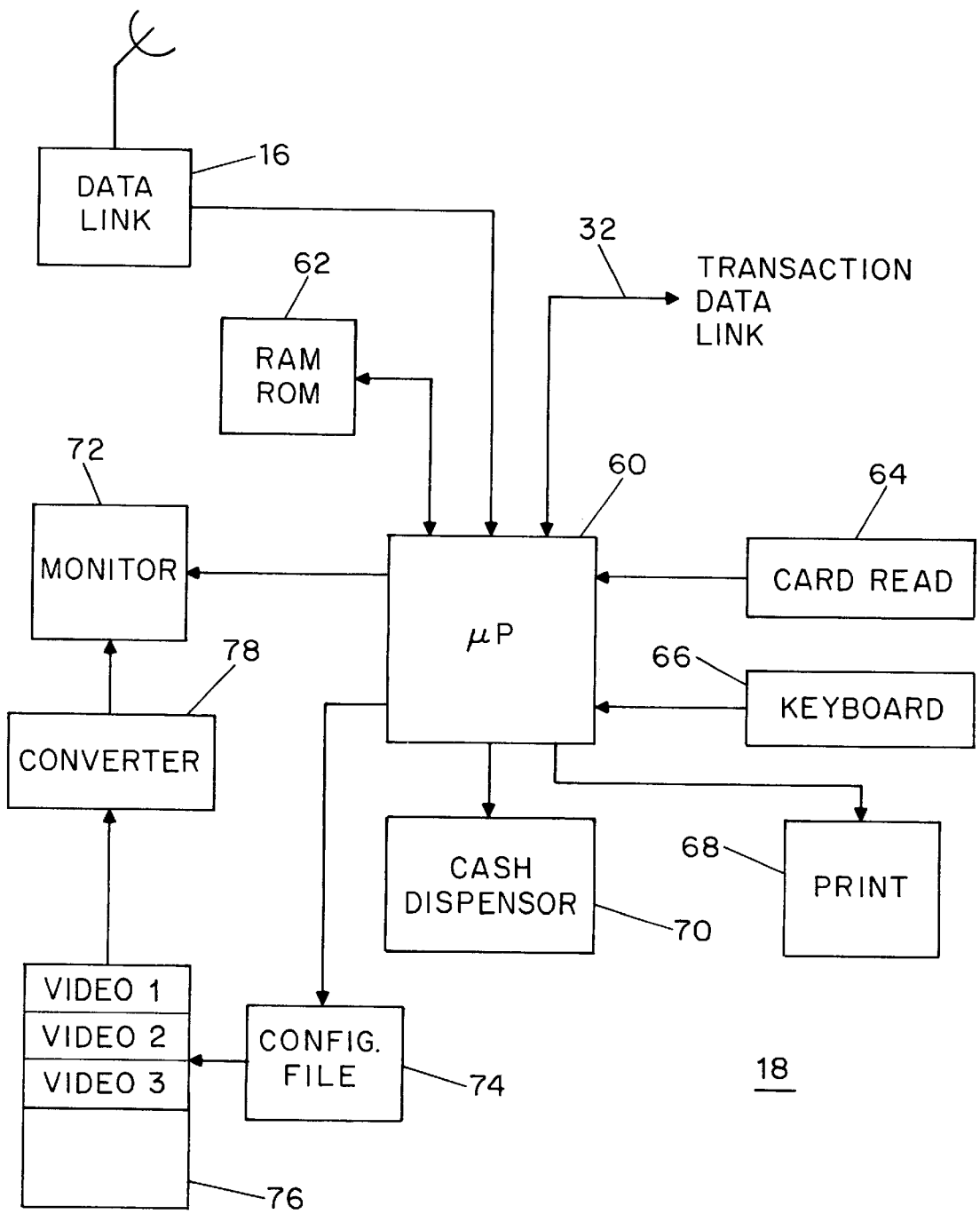
FIG. 3 is a block diagram of an exemplary transaction terminal usable in the FIG. 1 system.

Referring to FIG. 3, there is shown a terminal ATM 18 for displaying non-transaction messages in accordance with the present invention. Terminal 18 includes a processor 60, memory 62, cardreader 64, keyboard 66, printer 68, dispenser 70 and monitor 72 similar to corresponding elements included in a conventional ATM. The actual hardware included in a terminal will depend on the functions required. For example, a ticket vending terminal may have a ticket printer or a ticket dispenser instead of a cash dispenser. The processor 60 is preferably a high speed processor, such as a 166 MHZ or faster Pentium processor. Memory 62 preferably includes at least 16 MB or more of RAM. There is additionally provided a data storage device 76 for storing message files. The data storage device 76 is preferably a 2 GB or larger hard disk drive, optical CDROM drive, tape drive and the like. Where message files are hand carried to the terminal, a CDROM drive may be used. A data-to-video converter 78, which may be an MPEG-1 video card with audio is provided.

The configuration file 74 which is downloaded from the message processor 28 is used to control the selection of message files from storage device 76. The processor 60 interfaces with data communications equipment, which may include satellite station 16 or a cable connection and conventional telephone line 32. It should be noted that in some locations, such as a bank office, where multiple terminals 18 are co-located, such terminals may share access to satellite station 16 or cable connection and/or to telephone line 32. In some cases, a directed advertising campaign may include printed promotional materials, such as coupons, which are associated with a non-transaction message. For example, an advertisement for a local fast food establishment can have an associated coupon for a daily meal discount. Such promotional materials can be fixed incentives or customized based on the demographics of the user. In either case, the printer 68 is preferably used to generate and dispense such material. Alternatively, preprinted promotional materials related to selected non-transaction messages or transaction data can be loaded into the dispenser 70 for distribution of such materials. While only a selected number of such materials can be loaded in the dispenser 70, those materials can offer higher quality typesetting and the like than can normally be achieved by the printer 68.

Figure 4:
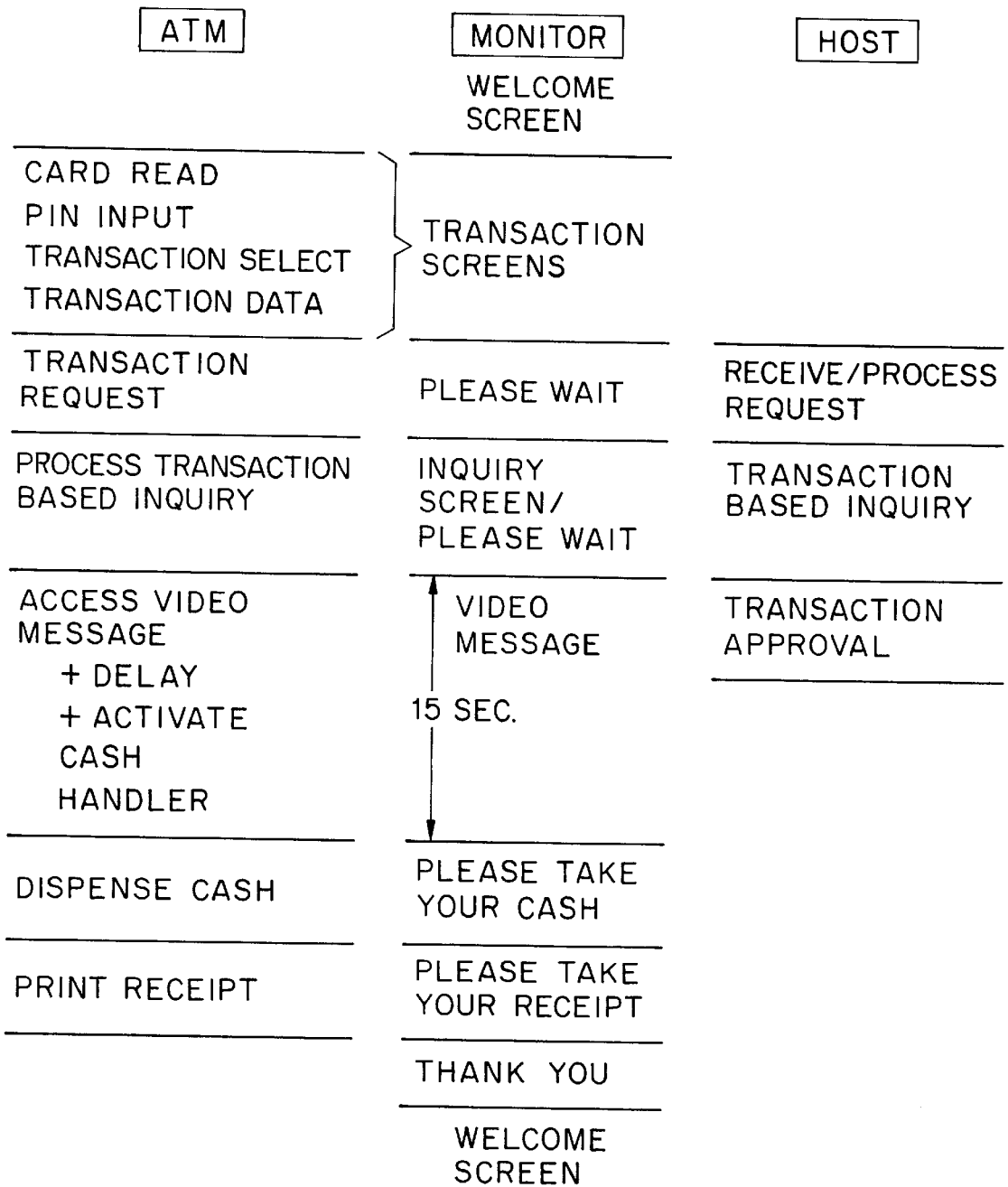
FIG. 4 is a time chart indicating a sequence of operation of a transaction terminal, a host computer and the terminal screen load sequence for an exemplary transaction according to the present invention.

FIG. 4 is a diagram illustrating an exemplary sequence of events in connection with a transaction and display of a non-transaction message according to one aspect of the present invention. The diagram includes events at the ATM processor, the ATM monitor and the host system. The display activity is generally referred to as the "screen load".

Initially the ATM is in a standby condition and displays a "welcome screen" that greets a user and indicates how to initiate a transaction, such as by inserting a bank card in the card reader. When a user inserts a bank card, the ATM reads the card information and places the data in a buffer memory. The ATM then displays a series of screens requesting, for example, entry of the user's PIN, selection of a transaction type, and, if appropriate, entry of a transaction amount. Responsive data is also placed in a buffer memory. This series of screens has a time duration which depends on the user's response. Excess delay, such as more than one or one and a half minutes, results in a "time out" condition and may terminate the transaction process. In the event of termination of the transaction process, the terminal returns to the welcome screen and standby condition. When all the transaction data has been entered, the ATM assembles a transaction request containing the entered transaction data and sends the request to the host 12 for processing. A "please wait" message is displayed.

At host 12, the transaction request is routed to transaction processor 26, which can perform preliminary examination of the request to determine whether the originating terminal can perform the requested transaction. For example, the transaction processor 26 can determine whether the terminal has sufficient cash or the proper denomination of bills to satisfy the requested transaction (i.e., the terminal might only be loaded with $20 bills and be unable to satisfy a requested amount such as $25). The transaction processor 26 also determines the institution that has responsibility for the user's account, called the issuer, and routes the transaction request data to the issuer through the host interface 34, either directly to an issuer 36, or through bank network 38 to issuers 40 or 42. It is understood that the customer's account may be administered for authorization purposes by another institution which performs the issuer function. In many instances the host or the issuer returns further inquires concerning the transaction, such as a request for concurrence to a transaction fee, or a request to designate an account from which cash is to be withdrawn or accounts between which transfers are to be made. These data inquires are sent to the ATM and prompt further screen requests for input of transaction data by the user. After the user responds to the inquires the screen again displays a "please wait" message.

When the transaction is approved, a signal is sent from the host 12 to the ATM 18 which causes the ATM 18 to access the configuration file 74, select a message file and display a non-transaction message. Preferably all messages have a fixed time duration, such as 15 seconds, so that the video display interval in the screen load is the same, independent of which message file is selected. In order to coordinate the ATM operation with the video presentation, operation of the ATM may be delayed. For example, in one arrangement the signal from the host to the ATM which occurs upon transaction approval does not activate the ATM to dispense cash or print a transaction record, but merely starts the video display. Approximately seven seconds or an appropriate time later, a further message from the host activates the ATM 18, to dispense cash or to print a record while the video message is being displayed. This delay allows adequate time for completion of the 15 second video before the cash or printed record is presented and the screen displays the next transaction message.

Alternatively, the seven second delay might be arranged in the ATM 18, wherein the signal from the host provides transaction approval, but the ATM 18 delays the cash dispensing or record printing during a first portion of the video display, such as seven seconds, before activating the cash dispenser or printer.

Accordingly, the user is given the impression that the ATM is continuing to work without delay for the video, because he or she hears the dispenser or printer operating during the video message. Further, when the user hears the cash dispenser operating he or she has a positive disposition toward the message being displayed.

After the video message presentation, the ATM proceeds through the usual steps to complete the transaction as shown in FIG. 4.

While it is possible to start the video display prior to transaction approval, such as after the transaction-based inquiries are completed, the possibility of displaying a message and then having a transaction denied can leave a negative impression with the user. Accordingly, it is considered to be preferable that the message be displayed only in connection with approved transactions. In some instances, a message may be selected to be displayed upon receipt of a denial message, such as a message suggesting the services of another financial institution.

It is also possible for non-transaction messages to be displayed intermittently during the welcome screen, particularly where the terminal is in a public location, such as a ticket vendor at a train station or airport.

An important feature of the invention is the ability to use the configuration file to specifically tailor presentation of messages by time, and in some cases by user characteristics. Accordingly commercial message delivery can be specific and delivered to a user who is paying attention to the monitor. The display of messages to the user is recorded by the ATM 18 in the form of a detailed "play log". The play log can include detailed reporting regarding each non-transaction message including the time, location, customer demographics, and other such information related to the display of the message. The play log data can be provided to the message processor 28 for purposes of reporting and billing to a sponsor of the message. Such a detailed reporting log is useful to the sponsor in judging the performance of the non-transaction messages.

It should be noted that when message files, configuration files and transaction data are transmitted by satellite link as shown in FIG. 1, the communications from terminals 18 to host 12 do not require the same bandwidth as the communications in the other direction which carry the message files. Accordingly, a high bandwidth transmission rate and protocol, such as 512 Kbps is appropriate for the message files, and a lower bandwidth (and data rate) protocol such as 128 Kbps (or other reasonably lower data rate) can be used for transferring configuration files, transaction data and acknowledgment messages. The use of lower bandwidth communication channels, where possible, reduces the processing and transmitter power requirements for the communications station 16 associated with transaction stations 14.

While the exemplary transaction described relates to a banking transaction, such as a cash withdrawal a similar, process can be used with respect to other terminal-based transactions, such as purchase of an airline, railroad or theater ticket.

As shown in FIG. 2, the transaction data messages from transaction processor 26 and the message files and configuration files from message processor 28 are both organized in router 24 and sent to terminals 18 preferably by satellite transmitter/receiver 30. Transaction data messages and acknowledgment of message file transmissions and configuration file transmissions are also preferably received through satellite transmitter/receiver 30.

An alternate is to provide entirely separate communications between transaction processor 26 and terminals 18 for transaction data, as now provided using telephone line 32, and broadcast of message files using satellite terminal 30. Configuration files, which are not as large as message files can either be sent via satellite broadcast or using telephone lines, either by the same router 24 or a completely separate router.

It should be noted that the message processor 28 and associated communications may be an entirely separate system from the transaction processor 26, such that a message processor can communicate with terminals associated with different transaction processors 26 at different host sites.

While there have been described what are believed to be the preferred arrangements and methods according to the invention, those skilled in the art will understand that other changes and modifications may be made thereto without departing from the spirit of the invention and it is intended to claim all such changes and modifications as fall within the true scope of the invention.

What is claimed is:

1. In a system wherein a transaction terminal responds to a presentation of a machine readable identification device by an authorized user, a method for providing a non-transaction message to said user comprising storing a plurality of message files corresponding to non-transaction messages in said terminal and selecting one of said message files for displaying the corresponding non-transaction message to said user according to data read from said machine readable identification device, wherein said selecting step is responsive to data identifying an issuer of said machine readable identification device and is further responsive to the geographical location of said issuer.

2. In a system wherein a transaction terminal is arranged to process transactions by an authorized user and to present non-transaction messages to said user interposed with transaction messages, the improvement wherein said terminal is arranged to store a plurality of message files corresponding to said non-transaction messages, and wherein said terminal is provided with a configuration file for controlling the selection of a message file corresponding to a non-transaction message to be displayed to said user, wherein said configuration file is arranged to control said message file selection according to the time of day.

3. The improvement specified in claim 2 wherein said configuration file is arranged to select said message files in rotational sequence.

4. The improvement specified in claim 2 wherein said configuration file is arranged to select one or more of said message files according to transaction data.

5. The improvement specified in claim 2 wherein said transaction terminal communicates with a host, and wherein said configuration file is arranged to control said message file selection according to messages received from said host.

6. In a system having an interactive transaction terminal with a monitor, wherein said terminal responds to operation by an authorized user to provide information, goods or services, and displays a sequence of transaction messages on said monitor, a method for supplying non-transaction messages to said user, comprising:

storing a plurality of message files in said transaction terminal, said message files comprising digital data corresponding to a plurality of selectable non-transaction messages;

operating said transaction terminal in response to transaction data entered by an authorized user to provide a sequence of transaction messages on said monitor;

selecting one of said message files for display to one of said authorized users according to at least a portion of said transaction data; and displaying said selected non-transaction message corresponding to said selected file to said user interposed with said sequence of transaction messages.

7. The method specified in claim 6 wherein said step of selecting comprises selecting a message according to transaction data identifying an establishment associated with said authorized user.

8. The method specified in claim 6 wherein said step of selecting comprises selecting a message file according to a transaction amount.

9. The method specified in claim 6 wherein said transaction terminal communicates with a host, and wherein said host provides a message to said transaction terminal to control selection of said message file for display.

10. The method specified in claim 6 wherein said step of selecting comprises selecting a message file according to the time of day.

11. The method specified in claim 6 further comprising the step of recording parameters associated with the displaying of said selected non-transaction message in a play log.

12. The method specified in claim 11 wherein said parameters include the time of day said selected non-transaction message was displayed.

13. In a system having an interactive transaction terminal with a monitor and a dispenser, wherein said terminal responds to operation by an authorized user to dispense cash or other media and displays a sequence of transaction messages on said monitor, a method for supplying non-transaction messages to said user, comprising:

storing at least one message file at said transaction terminal comprising digital data corresponding to at least one non-transaction message;

receiving transaction data from said user and processing said transaction data to generate an authorization signal, approving operation of said dispenser;

displaying said non-transaction message to said user in response to said authorization signal; and initiating operation of said dispenser during display of said non-transaction message a selected time following said authorization signal.

14. In a system having an interactive transaction terminal with a monitor and a printer, wherein said terminal responds to operation by an authorized user to print a transaction record and displays a sequence of transaction messages on said monitor, a method for supplying non-transaction messages to said user, comprising:

storing at least one message file at said transaction terminal, comprising digital data corresponding to at least one non-transaction message;

receiving transaction data from said user and processing said transaction data to generate an authorization signal, approving printing of said transaction record;

displaying said non-transaction message to said user in response to said authorization signal; and initiating operation of said printer to print said transaction record during display of said non-transaction message a selected time following said authorization signal.

15. The method specified in claim 14 wherein said at least one non-transaction message has promotional material associated therewith, the method including the step of printing said promotional material.

16. The method specified in claim 15 wherein the printed promotional material provides a variable incentive based on the transaction data.

17. The method specified in claim 14 wherein said transaction data has promotional material associated therewith, the method including the step of printing said promotional material.

18. The method specified in claim 17 wherein the printed promotional material provides a variable incentive based on the transaction data.

19. The method specified in claim 14 wherein the system further includes a dispenser and wherein said at least one non-transaction message has predetermined promotional material associated therewith, the method including the step of operating the dispenser to distribute said predetermined promotional material.

20. The method specified in claim 14 wherein the system further includes a dispenser and wherein said transaction data has predetermined promotional material associated therewith, the method including the step of operating the dispenser to distribute said predetermined promotional material.

* * * * *